United States Patent
Benson

Patent Number: 5,869,154
Date of Patent: Feb. 9, 1999

[54] RESIN COMPOSITION HAVING SPECIAL COLORS AND DECORATION ADDED THERETO

[75] Inventor: Julie M. Benson, Willowdale, Canada

[73] Assignee: Fort James Corporation, Richmond, Va.

[21] Appl. No.: 619,340

[22] Filed: Mar. 21, 1996

[51] Int. Cl.⁶ ................................................ B29D 22/00
[52] U.S. Cl. .................. 428/35.3; 428/34.1; 428/36.4; 428/323; 428/340; 428/402; 428/403; 526/159; 525/80; 525/82; 525/84; 524/439
[58] Field of Search ................... 526/159, 34.1, 526/35.3; 428/36.4, 323, 340, 402, 403; 525/80, 82, 84; 524/439

[56] References Cited

U.S. PATENT DOCUMENTS

| | | |
|---|---|---|
| 2,981,725 | 4/1961 | Luft et al. . |
| 3,242,099 | 3/1966 | Manyik et al. . |
| 3,414,553 | 12/1968 | Kern . |
| 3,534,006 | 10/1970 | Kamaishi et al. . |
| 3,639,332 | 2/1972 | Coover, Jr. et al. . |
| 3,907,145 | 9/1975 | Horvath . |
| 3,960,808 | 6/1976 | Katchman . |
| 4,113,668 | 9/1978 | Forward et al. . |
| 4,145,377 | 3/1979 | Bussink et al. . |
| 4,234,701 | 11/1980 | Abolins et al. . |
| 4,275,518 | 6/1981 | Martin . |
| 4,404,321 | 9/1983 | Abolins et al. . |
| 4,440,824 | 4/1984 | Bonis . |
| 4,457,961 | 7/1984 | Nakazawa et al. . |
| 4,463,113 | 7/1984 | Nakahara et al. . |
| 4,478,979 | 10/1984 | Abolins et al. . |
| 4,542,199 | 9/1985 | Kaminsky et al. . |
| 4,607,080 | 8/1986 | Yusa et al. . |
| 4,629,583 | 12/1986 | Goguen et al. . |
| 4,647,620 | 3/1987 | Doak . |
| 4,661,560 | 4/1987 | Abolins . |
| 4,661,561 | 4/1987 | Abolins . |
| 4,677,142 | 6/1987 | Solc . |
| 4,680,353 | 7/1987 | Ishihara et al. . |
| 4,795,782 | 1/1989 | Lutz et al. . |
| 4,840,997 | 6/1989 | Snell et al. . |
| 4,872,569 | 10/1989 | Bolte . |
| 4,937,272 | 6/1990 | Sumitomo . |
| 5,035,932 | 7/1991 | Snell et al. . |
| 5,115,047 | 5/1992 | Hashimoto et al. . |
| 5,142,005 | 8/1992 | Albizzati et al. . |
| 5,151,324 | 9/1992 | Hanatani et al. . |
| 5,177,124 | 1/1993 | Questel et al. . |

(List continued on next page.)

FOREIGN PATENT DOCUMENTS

| | | |
|---|---|---|
| 0 426 446 | 5/1991 | European Pat. Off. . |
| 54-114534 | 9/1979 | Japan . |
| 55-45753 | 3/1980 | Japan . |
| 1326006 | 8/1973 | United Kingdom . |

*Primary Examiner*—Rich Weisberger
*Attorney, Agent, or Firm*—Sixbey, Friedman, Leedom & Ferguson, PC; Charles M. Leedom, Jr.; Donald R. Studebaker

[57] ABSTRACT

Metal sparkles having one or more colors dispersed throughout a translucent resin at a concentration which eliminates the appearance of scratches and scuff marks on the resin surface. A pigment may be used in the translucent resin to yield a variety of decorative colors to create matching containers and utensils. The metal sparkle concentration in the translucent resin contains on an average 1½%–3% metal sparkles by weight and 0.25%–1% color by weight. The sparkle concentration may be used at a letdown ratio of 4% resulting in a composition having an average of 0.06%–0.12% sparkles by weight and 0.01%–0.04% color by weight. The sparkles are random cuts of multi-colored aluminum having an average size of ¹⁄₆₄" (0.015) and are manufactured from the thinnest standard sheets of aluminum which are polished to a mirror-like surface of brilliant reflectivity. The colors used for the metal sparkles come with a wide variety of coatings of transparent epoxy, nitrocellulose, and vinyl lacquers with a practically limitless range of color combinations. These metal sparkles are provided in the pigment used to color the translucent resin material.

4 Claims, 3 Drawing Sheets

U.S. PATENT DOCUMENTS

| | | |
|---|---|---|
| 5,274,029 | 12/1993 | Kelley . |
| 5,280,052 | 1/1994 | Questel et al. . |
| 5,290,837 | 3/1994 | Ghidoni et al. . |
| 5,307,250 | 4/1994 | Pearson et al. . |
| 5,322,869 | 6/1994 | Yamasaki et al. . |
| 5,367,003 | 11/1994 | Petcavich . |
| 5,370,813 | 12/1994 | DeNicola, Jr. et al. . |
| 5,393,603 | 2/1995 | Toyoda et al. . |
| 5,420,179 | 5/1995 | Fourquier et al. . |
| 5,451,624 | 9/1995 | Memon et al. . |

FIG.1a
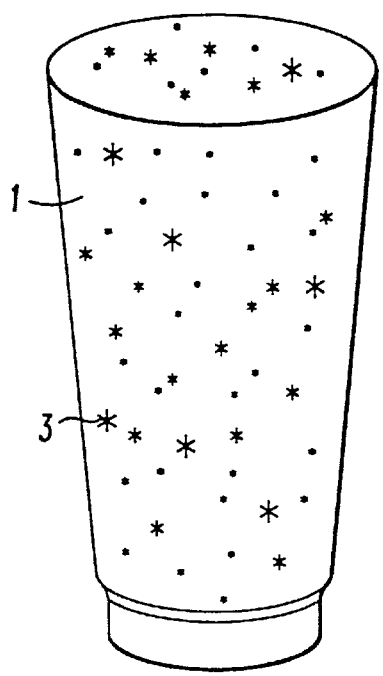
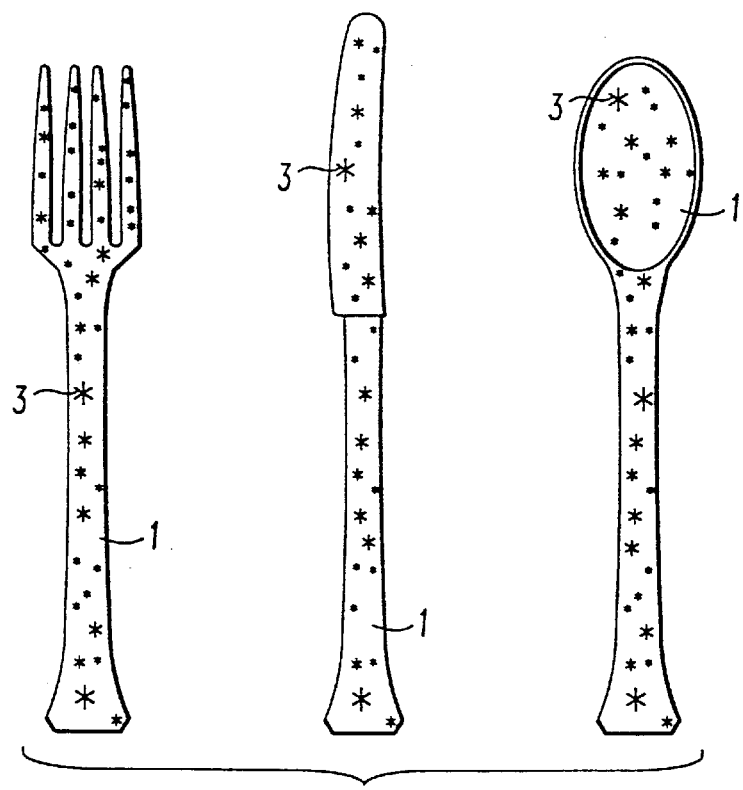
FIG.1b

FIG.1c
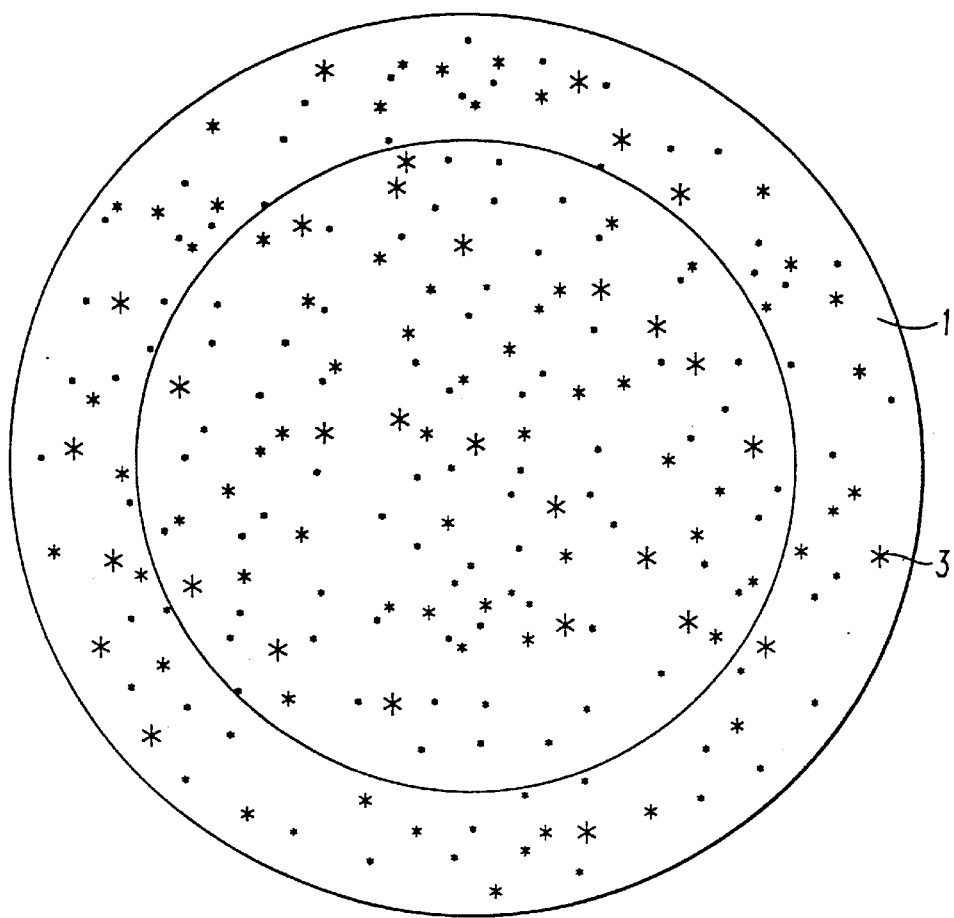
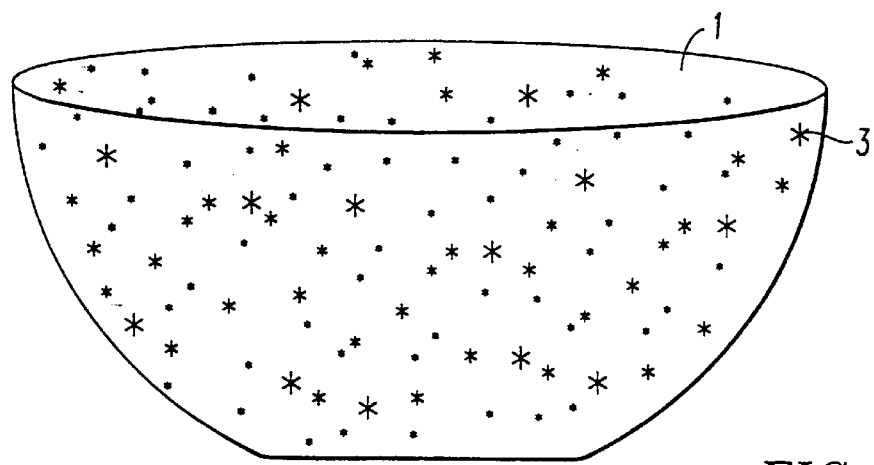
FIG.1d

RESIN COMPOSITION HAVING SPECIAL COLORS AND DECORATION ADDED THERETO

TECHNICAL FIELD OF THE INVENTION

The present invention relates to adding colors and decoration to a resin for forming utensils and containers, and more specifically to an improved composition and method for forming the same using additives in a translucent resin composition such as crystal styrene to virtually eliminate the appearance of scratch or scuff marks on the translucent resin composition surface.

BACKGROUND OF THE INVENTION

Manufacturers of disposable products such as cups, plates and utensils are continuously seeking ways to improve the quality of their products to enhance consumer satisfaction. In achieving this goal, however, the manufacturers endeavor to simplify the manufacturing process to reduce overall costs. To remain competitive in the marketplace, manufacturers must be creative and ambitious to make a product that appeals to a broad spectrum of consumers.

In the past, disposable products such as cups and plates were mainly manufactured from paper which provided a low cost product that was not only disposable but recyclable. The disadvantages of using a paper product however, arise when they are used to hold liquid substances. For example, if one used a paper cup to hold six ounces of water, the paper would eventually soften and become unstable. Consequently, this design proved not to be desirable by those who needed a more sturdy and durable product. To overcome the deficiencies of plain paper, manufacturers began to use wax laminated onto paper to decrease the permeability of the disposable paper product. This process, however, does not overcome the durability problem associated with paper products. Consumers could very easily deform paper cups, thus, rendering them unusable and consequently, undesirable to consumers.

Manufacturers of disposable products realized the advantages of plastics which can be molded into virtually any shape such as disposable containers and utensils. Containers and utensils manufactured from plastic can be formed to give the appearance of glass which is desirable to consumers. In order to obtain the image of glass, the plastic must be made from a translucent material to allow the passage of light. A pigment may be added to yield a variety of decorative colors. Plastic containers and utensils currently on the market which comprise the translucent characteristics discussed above suffer from being easily scratched due to the softness of the plastic material used. These scratches become visible to the naked eye and detract from the appearance of the product. Consequently, the product loses its decorative appeal and consumer satisfaction declines.

In view of the existing disposable containers and utensils available on the market today, as discussed above, the inventor has recognized the need for a disposable plastic product that provides the decorative appeal of glass, however, does not visibly show scratches or scuff marks on its surface. Moreover, the inventor recognizes that to stay competitive in the marketplace, a process which uses existing tooling and manufacturing materials should be implemented to make the disposable plastic product cost effective.

SUMMARY OF THE INVENTION

It is therefore an object of the present invention to provide an improved disposable plastic product that is durable yet decorative to appeal to a wide variety of consumers.

It is also an object of the present invention to provide an improved disposable plastic product that does not visibly show scratches or scuff marks.

These and other objectives are achieved by a resin composition having special colors and decoration added thereto comprising a translucent resin material, such as crystal styrene, and metal sparkles having one or more colors dispersed throughout to provide decorative appeal and to virtually eliminate the visibility of scratches or scuffs on the product surface. A pigment may be used in the translucent resin composition to yield a variety of decorative colors to create matching sets of containers and utensils.

The metal sparkle concentration in the translucent resin material contains on an average 1½ –3% metal sparkles by weight and 0.25%–1% color by weight. The sparkle concentration may be used at a letdown ratio of 4% which would reduce the average to 0.06%–0.12% sparkles by weight and 0.01%–0.04% color by weight when mixed with the translucent resin.

The metal sparkles are random cuts of multi-colored aluminum having an average size of ¹⁄₆₄" (0.015). The sparkles are manufactured from the thinnest standard sheets of aluminum which are polished to a mirror-like surface of brilliant reflectivity. The colors used for the metal sparkles come with a wide variety of coatings of transparent epoxy, nitrocellulose, and vinyl lacquers with a practically limitless range of color combinations. These metal sparkles are provided in the pigment used to color the translucent resin composition.

The combination of translucent resin and metal sparkles dispersed therein at the concentration noted above create a disposable plastic product having a translucent surface that does not visibly scratch or scuff. The process for manufacturing this composition uses existing tooling and manufacturing materials to provide an improved product that is cost effective and easy to manufacture.

BRIEF DESCRIPTION OF THE DRAWINGS

FIG. 1a is an elevational plan view of the preferred embodiment of the present invention in the form of a cup.

FIG. 1b is an elevational plan view of the preferred embodiment of the present invention in the form of a fork, knife and spoon.

FIG. 1c is an elevational plan view of the preferred embodiment of the present invention in the form of a plate.

FIG. 1d is an elevational plan view of the preferred embodiment of the present invention in the form of a bowl.

DETAILED DESCRIPTION OF THE PREFERRED EMBODIMENT

Figure 2:
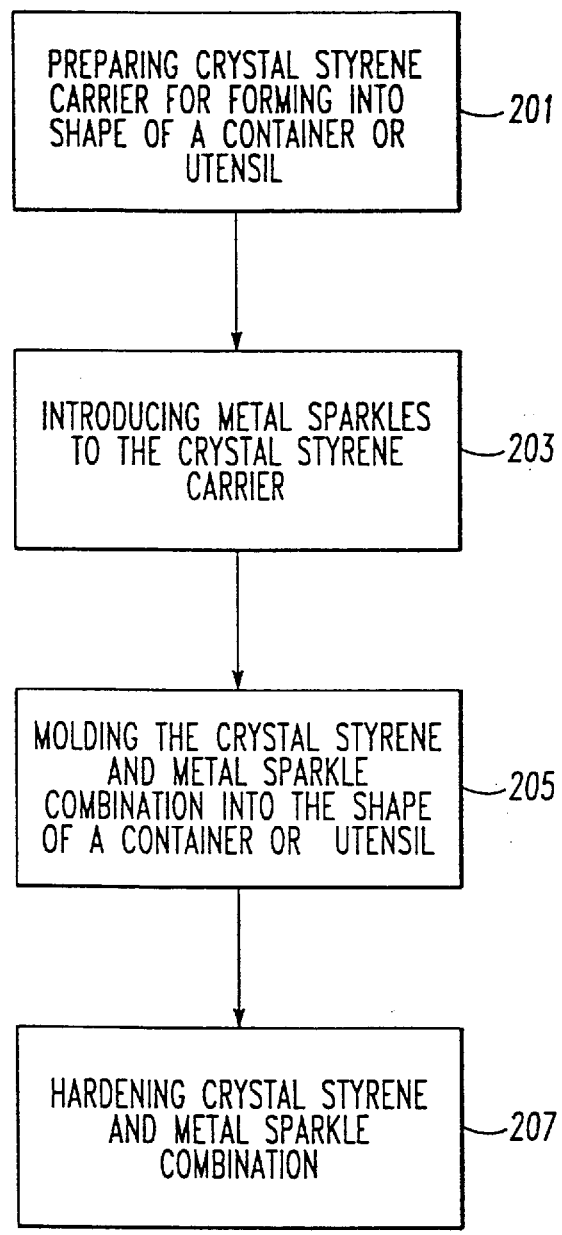
FIG. 2. illustrates the method used to manufacture the present invention in accordance with the preferred embodiment.

The present invention is directed to the combination of a translucent resin material and decoration having one or more colors dispersed throughout the resin to provide decorative appeal and to virtually eliminate the visibility of scratches or scuffs on the product surface.

The composition of the present invention may be used to form containers, utensils, plates and bowls as shown in FIGS. 1a–d, respectively. Translucent resin material 1, illustrated in FIGS. 1a–d, is composed of crystal styrene in the preferred embodiment which will be used to describe the present invention. One skilled in the art, however, should appreciate that any suitable translucent resin material may be used in combination with the present invention. Moreover, one skilled in the art should appreciate that the present composition may be used to form a variety of containers and utensils and is not limited to the specific items shown in FIGS. 1a–1d.

The properties of crystal styrene make it the preferred resin in the present invention. Specifically, crystal styrene is a durable resin and exhibits a glass-like appearance to provide a very desirable consumer product. The cost to manufacture a product from crystal styrene is below that of glass and the styrene material is strong and rigid and thus, has many possible uses. The durability of crystal styrene allows it to be used for cutlery and other items requiring a sturdy material.

Crystal styrene may be completely transparent without any pigment or color added. Nevertheless, a pigment may be added in order to provide different translucent colors of crystal styrene for decorative purposes. By adding the pigment, containers and utensils comprising the pigmented crystal styrene may be matched according to colors to accommodate a wide variety of consumer tastes.

The composition of the present invention further includes metal sparkles illustrated as decoration 3 in FIGS. 1a–d. The metal sparkles are random cuts of multi-colored aluminum having an average size of 1/64" (0.015). The metal sparkles are manufactured from the thinnest standard sheets of aluminum which are polished to a mirror-like surface of brilliant reflectivity. The metal sparkles used in the present invention may be obtained from Meadowbrook Inventions, Inc. which manufactures a product called METALLIC JEWELS. These METALLIC JEWELS provide the sparkling luster exhibited by the containers and utensils of the present invention.

The colors used for the metal sparkles come with a wide variety of coatings of transparent epoxy, nitrocellulose, and vinyl lacquers with a practically limitless range of color combinations. These metal sparkles may be provided in the pigment used to color the crystal styrene carrier. However, if no color is desired, the metal sparkles are introduced to the crystal styrene carrier in their raw form as discussed below in reference to the method of manufacturing the present invention.

The composition of crystal styrene and metal sparkles includes a sparkle concentration having an average of 1½%–3% metal sparkles by weight and 0.25%–1% color by weight. The sparkle concentration is preferably used at a letdown ratio of 4% such that the composition contains an average of 0.06%–0.12% sparkles and 0.01%–0.04% color. Therefore, a small amount of sparkles are used in the crystal styrene carrier to create a metallic luster in the resulting product. Nevertheless, the concentration of metal sparkles in combination with the crystal styrene carrier provide a utilitarian function, in that, the resulting composition virtually eliminates the appearance of scratch or scuff marks on the product surface.

The inventor has discovered that the disclosed concentration of metal sparkles randomly dispersed throughout the translucent crystal styrene resin create a decorative appearance that causes scratch and scuff marks to become invisible to the human eye. The inventor realized that this unexpected result can vastly improve consumer appeal with regard to disposable plastic products such as dinnerware (containers, cups, utensils, etc.). Many of these disposable plastic products currently on the market scratch and scuff very easily thus, detracting from its decorative appearance. Dinnerware that maintains its decorative appearance after being scratched and scuffed creates a new standard for disposable plastic products. The present invention allows consumers the benefit of a decorative disposable product that is not only durable, but retains its glass-like appearance even after it has been scratched.

The method for manufacturing the present invention will now be discussed in reference to FIG. 2. The inventor realized that in order to minimize manufacturing cost to make an affordable disposable product, existing tooling and manufacturing materials should be utilized. As such, the method for manufacturing the present invention is a simple process that utilizes existing manufacturing techniques which are explained below.

The process begins with preparing the crystal styrene carrier in a liquid form for receiving the metal sparkles, as shown in block 201 of FIG. 2. If pigment is to be added to the liquid crystal styrene, the metal sparkles at the above-noted concentrations are mixed with the pigment before adding the mixture to the crystal styrene. If no pigment is to be added, the metal sparkles at the above-noted concentrations are added directly to the crystal styrene carrier, as shown in block 203 of FIG. 2.

The crystal styrene and metal sparkle composition is then molded into the shape of container or utensil desired, as illustrated in block 205 of FIG. 2. The mold of the crystal styrene and metal sparkle composition is then hardened, as shown in block 207, and the resulting product is a container, utensil or similar item that is decorative, yet prevents the visibility of scratches or scuff marks on its surface.

While the invention has been described with reference to the preferred embodiment, it should be appreciated by those skilled in the art that the invention may be practiced otherwise than as specifically described herein without departing from the spirit and scope of the invention. It is therefore understood that the spirit and scope of the invention be limited only by the appended claims.

What is claimed is:

1. A colored composition having a metallic sparkling luster, said composition comprising:

a resin carrier having translucent characteristics and a shape of at least one of a container and utensil; and metal sparkles dispersed within said resin carrier, said metal sparkles having an average size of 1/64", an average concentration of 0.06% to 0.12% by weight, and a pigment concentration of 0.01% to 0.04% by weight in said resin carrier, wherein the concentration of the metal sparkles dispersed within said resin carrier prevent the visibility of scratches and scuff marks in said composition.

2. The composition of claim 1 wherein said resin carrier comprises crystal styrene.

3. The composition of claim 1 wherein said metal sparkles are formed from multi-colored aluminum coated with at least one of a transparent epoxy, nitrocellulose, and vinyl lacquer.

4. The composition of claim 1, wherein a concentration having 1½% to 3% by weight of metal sparkles and 0.25% to 1% by weight of pigment is combined with said resin carrier.

* * * * *